United States Patent
Mueller et al.

(10) Patent No.: US 12,249,173 B2
(45) Date of Patent: *Mar. 11, 2025

(54) BIOMETRIC SENSOR WITH PRESENCE SENSORS

(71) Applicant: NEXT Biometrics Group ASA, Oslo (NO)

(72) Inventors: Robert Mueller, Riemerling (DE); Matias N. Troccoli, Kirkland, WA (US); King Hong Kwan, Bellevue, WA (US)

(73) Assignee: NEXT Biometrics Group ASA, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,538

(22) Filed: Nov. 30, 2023

(65) Prior Publication Data

US 2024/0096126 A1  Mar. 21, 2024

Related U.S. Application Data

(63) Continuation of application No. 17/642,834, filed as application No. PCT/EP2020/076279 on Sep. 21, 2020, now Pat. No. 11,854,291.

(Continued)

(51) Int. Cl.
*G06V 40/13* (2022.01)
*G06V 40/12* (2022.01)

(52) U.S. Cl.
CPC ...... *G06V 40/1306* (2022.01); *G06V 40/1394* (2022.01); *G06V 40/1365* (2022.01)

(58) Field of Classification Search
CPC . G06V 40/1306; G06V 40/1382–1394; G06V 40/12–40/1394
See application file for complete search history.

(56) References Cited

U.S. PATENT DOCUMENTS 6,091,837 A * 7/2000 Dinh ............... A61B 5/1172
374/141
10,203,816 B2   2/2019 Nelson et al.
(Continued)

FOREIGN PATENT DOCUMENTS

JP  H11197135 A   7/1999
JP  2008009616 A  1/2008
(Continued)

OTHER PUBLICATIONS

Korean Patent Office, Office Action dated Feb. 28, 2024, for corresponding Korean Patent Application No. 1020227013138 (English translation provided).

*Primary Examiner* — Wassim Mahrouka
(74) *Attorney, Agent, or Firm* — Duane Morris LLP

(57) ABSTRACT

In one embodiment, a sensor system includes an active thermal sensor pixel matrix, a plurality of presence sensors, and an image acquisition controller. The pixel matrix includes a plurality of pixels arranged in a plurality of rows and a plurality of columns and a boundary defining a perimeter. The plurality of presence sensors is disposed at least partially within the boundary of the pixel matrix. The image acquisition controller is coupled to the pixel matrix and the plurality of presence sensors. The image acquisition controller is configured to: (i) receive signals from the presence sensors; (ii) identify, based on the signals, a scan region, wherein the scan region is a portion of the pixel matrix that is in contact with or adjacent to a specimen; and (iii) obtain image data only from pixels that are within the scan region for generating an image of the specimen.

22 Claims, 6 Drawing Sheets

Related U.S. Application Data

(60) Provisional application No. 62/902,609, filed on Sep. 19, 2019.

(56) References Cited

U.S. PATENT DOCUMENTS

| | | | |
|---|---|---|---|
| 10,203,826 B2 | 2/2019 | Nelson et al. | |
| 10,203,827 B2 | 2/2019 | Nelson et al. | |
| 10,203,828 B2 | 2/2019 | Nelson et al. | |
| 10,282,579 B2 | 5/2019 | Thompson et al. | |
| 2014/0333328 A1 | 11/2014 | Nelson et al. | |
| 2016/0246396 A1* | 8/2016 | Dickinson | G06F 3/043 |
| 2017/0220842 A1 | 8/2017 | Thompson et al. | |
| 2017/0255299 A1 | 9/2017 | Shimoshikiryoh | |
| 2017/0315640 A1 | 11/2017 | Nelson et al. | |
| 2017/0336894 A1 | 11/2017 | Nelson et al. | |
| 2017/0364176 A1 | 12/2017 | Kim et al. | |
| 2017/0364178 A1 | 12/2017 | Nelson et al. | |
| 2018/0039349 A1 | 2/2018 | Han et al. | |
| 2018/0218195 A1 | 8/2018 | Sheik-Nainar et al. | |
| 2019/0171306 A1 | 6/2019 | Kim et al. | |
| 2021/0004554 A1 | 1/2021 | Kobayashi et al. | |

FOREIGN PATENT DOCUMENTS

| | | |
|---|---|---|
| JP | 2012168662 A | 9/2012 |
| JP | 2019102090 A | 6/2019 |
| KR | 20170100461 A | 9/2017 |
| KR | 20180100147 A | 9/2018 |
| WO | 2016039244 A1 | 3/2016 |
| WO | 2019167425 A1 | 9/2019 |

* cited by examiner

BIOMETRIC SENSOR WITH PRESENCE SENSORS

PRIORITY CLAIM AND CROSS-REFERENCE

This application is a continuation of U.S. patent application Ser. No. 17/642,834, filed Mar. 14, 2022, as a national phase application of International Application No. PCT/EP2020/076279, filed Sep. 21, 2020, which claims the benefit of and priority to U.S. Provisional Application No. 62/902,609 filed on Sep. 19, 2019, which applications are incorporated herein by reference in their entirety.

BACKGROUND

Biometric security has attracted a great deal of attention. Fingerprint sensors are one form of technology used to provide such security. The fine patterns formed by ridges and valleys on the finger's skin can be mapped by sensing arrays. These sensing arrays have been used for a number of years in this field, but they vary in basic operating principles. Some sensors utilize heat signals, while others utilize electrical or optical signals. Accuracy levels are limited by the physical principles used to read fingerprint patterns (i.e., optical, capacitive, pressure, etc.). Furthermore, immunity to environmental variables such as dirt or humidity is also important when performing a fingerprint scan.

Fingerprint sensors are often used in electronic devices to verify the identity of the user and to restrict access unless the sensor verifies that an authorized user is attempting to use the device. For example, certain smart credit cards require verification of the user via a fingerprint sensor before use. Fingerprint sensors are also included in computing devices—such as smartphones, tablet computers, laptops, and point of sale devices—to ensure that only authorized users are able to unlock and use such devices.

Active sensors quantify a specific physical parameter response to a given stimulus. One such method is the active thermal principle. Active thermal sensors measure an object's heat conductance for a given heating stimulus. Examples of sensors of this type are disclosed in U.S. Pat. No. 6,091,837 to Dinh, entitled "Sensor for Acquiring a Fingerprint Image Based on Heat Transfer" and U.S. Pat. No. 8,724,860, also to Dinh, entitled "Apparatus for Fingerprint Sensing and Other Measurements," the entireties of each of which are incorporated by reference herein. The response to the stimulus is measured by each of the sensing sites within a sensor array. The thermal response of an element is in part a function of the stimulus provided, i.e., the larger the stimulus, the larger the response. Sensing sites are heated by application of an electrical current to the site.

BRIEF DESCRIPTION OF THE DRAWINGS

The features of the embodiments described herein will be more fully disclosed in the following detailed description, which is to be considered together with the accompanying drawings wherein like numbers refer to like parts and further wherein.

DETAILED DESCRIPTION

Overview

Figure 1:
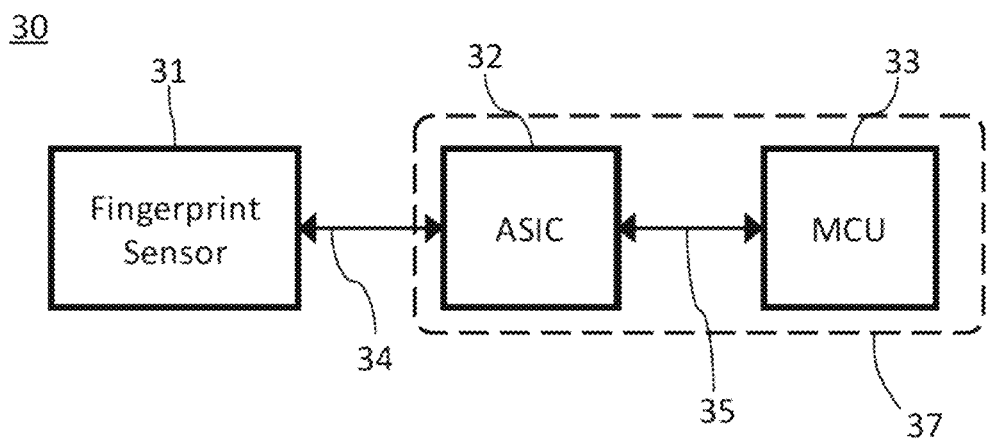
FIG. 1 is a schematic illustration of a biometric sensor system in accordance with some embodiments of the present technology.

Biometric sensors systems capable of selective scanning and spoof detection, and associated systems and methods, are disclosed herein. In some embodiments, the biometric sensor system is a fingerprint sensor system that includes a fingerprint sensor having an active pixel matrix and a plurality of presence sensors, and an image acquisition controller in communication with the fingerprint sensor. In some embodiments, the active pixel matrix is an active thermal pixel matrix. The pixel matrix includes a plurality of pixels arranged in a plurality of rows and a plurality of columns. The pixel matrix has a boundary defining a perimeter of the pixel matrix. Each of the plurality of presence sensors is disposed at least partially within the boundary of the pixel matrix. The image acquisition controller is coupled to the pixel matrix and the plurality of presence sensors. The image acquisition controller receives signals and/or data from the pixel matrix and the plurality of presence sensors. In some embodiments, the image acquisition controller is configured to identify, based on the signals from the presence sensors, a portion of the pixel matrix that is in contact with or adjacent to a specimen (a "scan region"). The image acquisition controller is further configured to obtain image data only from a subset of the pixel matrix for generating an image of the specimen. For example, the image acquisition controller can be configured to obtain image data from only the pixel within the scan region.

In some embodiments, the plurality of presence sensors is implemented as a plurality of electrodes. The image acquisition controller is configured to receive signals from the plurality of pixels and/or the plurality of electrodes. In some embodiments, the signals from the plurality of electrodes reflect capacitive measurements of a specimen. In some embodiments, the image acquisition controller is configured to determine when the capacitive measurements reflect a change in capacitance above a predetermined threshold, thereby indicating that a living specimen is in contact with or adjacent to the sensor. When the change in capacitance is above the predetermined threshold, the image controller can obtain image data from pixels of the pixel matrix for generating an image. In some embodiments, the image acquisition controller is configured to determine when the capacitive measurements reflect a change in capacitance within a predetermined window, thereby indicating that a living specimen is in contact with or adjacent to the sensor. When the change in capacitance is above the predetermined threshold, the image controller can obtain image data from pixels of the pixel matrix for generating an image. In some embodiments, the image acquisition controller is further configured to identify, based on the signals, a scan region. In some embodiments, the scan region is a portion of the pixel matrix that is in contact with or adjacent to the specimen on the pixel matrix. The image acquisition controller is further configured to the obtain image data only from a subset pixels that are within the scan region for generating an image of the specimen.

The combination of the presence sensors and the active pixel matrix provides a number of advantages. In particular, the presence sensors allow for the identification of the position of a specimen on the sensor such that only a portion of the active pixels need to be addressed and scanned. As a result, the time required to scan a specimen using the active pixel matrix can be reduced by only addressing the portions of the sensor (i.e., the portions of the pixel matrix) that are in contact with, or adjacent to, the specimen. In addition, the presence sensors described herein can be used to detect attempts of unauthorized access. For example, the presence sensors can be used to detect so-called "spoofing" attacks.

The figures are not necessarily drawn to scale and certain features may be shown exaggerated in scale or in somewhat schematic form in the interest of clarity and conciseness. As used herein, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the figure being discussed. These relative terms are for convenience of description and normally are not intended to require a particular orientation. Similarly, terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The biometric sensors described herein, such as fingerprint sensors, utilize presence sensors integrated with a matrix of imaging pixels. Although primarily described herein primarily in the context of active thermal fingerprint sensors, it will be understood that the imaging pixels can be a part of optical fingerprint scanners, capacitive fingerprint scanners, ultrasonic fingerprint scanners, and/or various other suitable fingerprint scanners. Further, although the present technology is described herein primarily with reference to a fingerprint sensor, it should be understood that the combination of presence sensors and biometric sensors, and the related systems and methods, can be applied in various other biometric sensor systems. Accordingly, the scope of the present technology is limited only as set out in the appended claims.

Fingerprint Sensor Systems

FIG. 1 is a schematic diagram of a biometric sensor system 30 in accordance with some embodiments of the present technology. In the illustrated embodiment, the biometric sensor system 30 includes a fingerprint sensor 31, an image capture application-specific integrated circuit ("ASIC") 32 in communication with the fingerprint sensor 31 through interface 34, and a microcontroller unit ("MCU") 33 in communication with the ASIC 32 through interface 35. The fingerprint sensor 31 is configured, under control of the ASIC 32, to capture an image of a fingerprint and transmit image data as signals through the interface 34. In some embodiments, the fingerprint sensor 31 outputs analog signals, and interface 34 is an analog interface. The ASIC 32 can receive the analog signals and perform an analog-to-digital conversion ("A/D conversion") before sending the image data to the MCU 33. Alternatively, in some embodiments, the A/D conversion can occur within fingerprint sensor 31 such that fingerprint sensor 31 outputs a digital signal and interface 34 is a digital interface. For example, in embodiments in which the fingerprint sensor 31 includes a matrix of pixels (as described below), each pixel may include A/D conversion and output a digital signal to ASIC 32. In some embodiments, the fingerprint sensor 31 can output the digital signal directly to the MCU 33. The interface 34 also carries various other signals from the fingerprint sensor. The ASIC 32 and/or MCU 33 can evaluate those signals to determine a presence and location of a specimen on the fingerprint sensor 31. That information is used by the ASIC 32 and/or MCU 33 to control scanning. For example, the ASIC 32 and/or MCU 33 can identify a sub-portion of the fingerprint sensor 31, and the ASIC 32 can direct the fingerprint sensor 31 to scan only the sub-portion.

The ASIC 32 reads the image data from the fingerprint sensor 31 and transfers it to the MCU 33 via the interface 35 (e.g., SPI, USB, or other suitable interface). The MCU 33 processes the image data, extracts characteristic features, and generates a fingerprint template (e.g., an image of the fingerprint), typically based on minutiae in the image data. In some embodiments, the MCU 33 is provided with a fingerprint matching functionality that compares the fingerprint template to one or more stored fingerprints (e.g., corresponding to the fingerprints of authorized persons) to determine whether the template matches any of the stored fingerprints. In some embodiments, the ASIC 32 and the MCU 33 are components of an image acquisition controller 37. In various embodiments, the image acquisition controller 37 also includes one or more processors (not shown), which may be part of a host system (e.g., a smartphone, smart card, etc.) into which the biometric sensor system 30 is integrated.

In various embodiments, the functionality of ASIC 32, MCU 33, the image acquisition controller 37, and/or a smart card chip (not shown) can be integrated into a single chip or chips within the host system. For example, the biometric sensor system 30 may be used in a mobile phone, a personal computer, an access control system, a USB reader, a point of sale terminal, a smart card, or any other appropriate application. In some embodiments, such as for smart credit card embodiments, the fingerprint template may be transferred to a smart card chip (integrated circuit card chip, ICC) where the storage and matching is performed in a so-called on-card biometric comparison application, sometimes also called "match on card" or "match on SE" (secure element).

Figure 2:
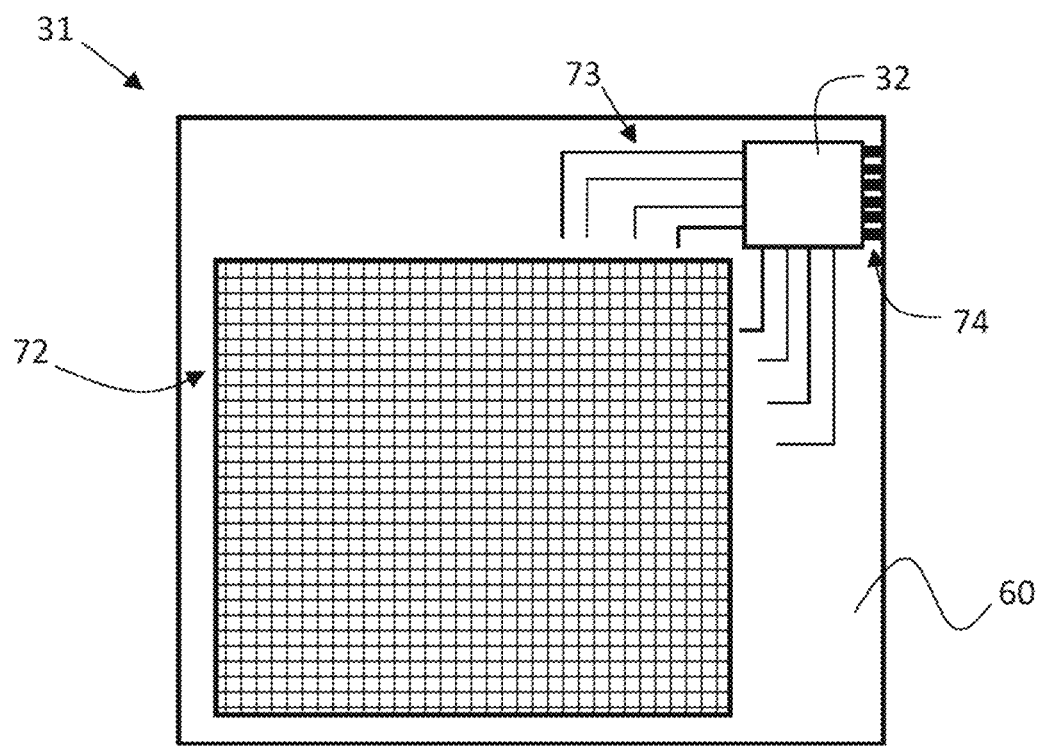
FIG. 2 is a partially schematic illustration of a fingerprint sensor in accordance with some embodiments of the present technology.

FIG. 2 is a partially schematic illustration of a fingerprint sensor 31 in accordance with some embodiments of the present technology. In the illustrated embodiment, the fingerprint sensor 31 includes a substrate 60, a pixel matrix 72, circuitry 73, and connection points 74. In some embodiments, the ASIC 32 can be mounted to substrate 60, for example as shown in FIG. 2. In some embodiments, the fingerprint sensor 31 is a flexible sensor and substrate 60 is a flexible material such as, for example, polyimide. In various embodiments, the substrate 60 can also be constructed from plastic (e.g., polyethylene terephthalate, polyethylene naphthalate, etc.), a metal foil (e.g., steel, aluminum, etc.), a semiconductor material (e.g., silicon), quartz, glass or any material that is suitable for depositing microelectronic structures in production.

As illustrated in FIG. 2, the pixel matrix 72 is positioned over a surface of the substrate 60. In some embodiments, pixel matrix 72 is formed over the surface of the substrate 60 using a deposition process (e.g., low temperature polysilicon (LTPS)). The connection points 74 are electrically coupled to the pixel matrix 72 (e.g., communicatively via the ASIC 32) and allow for connection to an external system, such as, for example, the MCU 33 (FIG. 1). In some embodiments, a protective coating (not illustrated) may be applied over pixel matrix 72. As will be described further herein, the surrounding circuitry 73 includes address lines that allow certain rows or columns of pixel matrix 72 to be selectively scanned or read.

In some embodiments, the fingerprint sensor 31 operates on the active thermal sensing principle. In such embodiments, a low power heat pulse is applied to each sensor pixel over a short period of time and a response is measured. This type of fingerprint sensor can be produced through large area production processes, such as those that form LTPS thin film transistors and devices. In some embodiments, the fingerprint sensor 31 is a sensor based on the active thermal sensing principle as described in, for example, U.S. Pat. No. 6,091,837 entitled "Sensor For Acquiring a Fingerprint" issued Jul. 18, 2000 and U.S. Pat. No. 7,910,902 entitled "Apparatus for Fingerprint Sensing" issued Mar. 22, 2011, the entireties of which are incorporated herein by reference.

Figure 3:
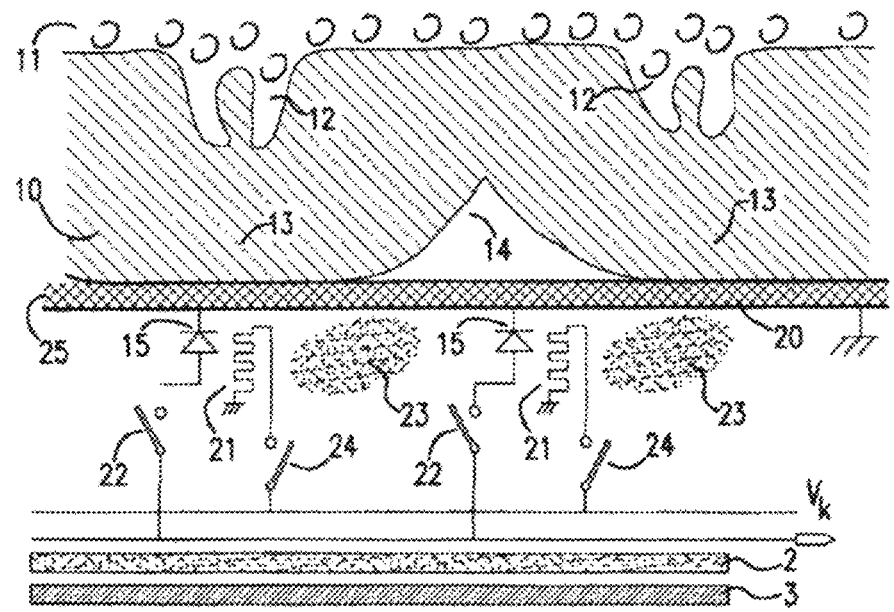
FIG. 3 is a partially schematic illustration of a sensor operating under the active thermal principle.
Figure 4:
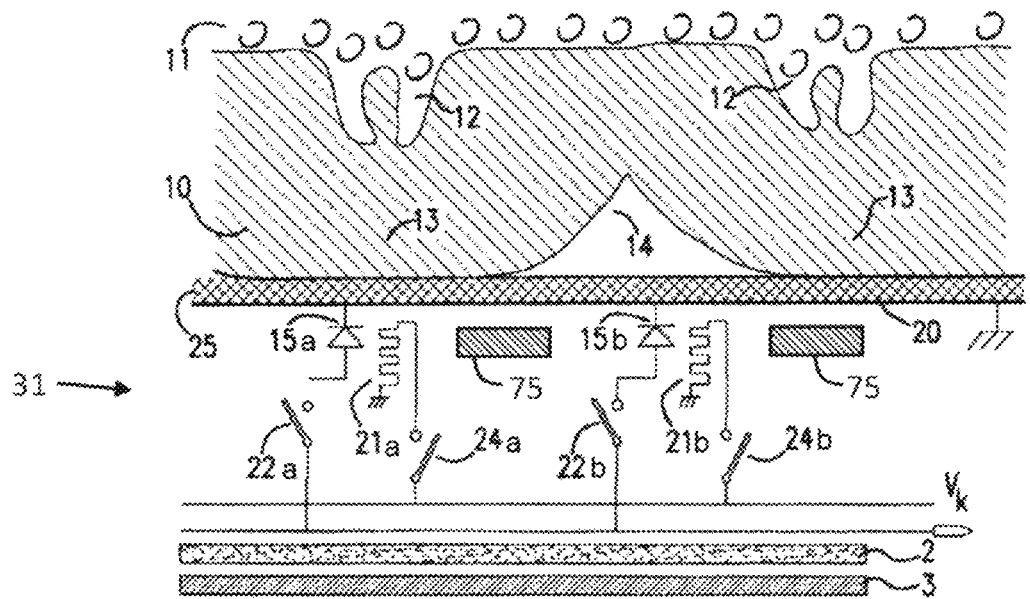
FIG. 4 is a partially schematic illustration of a sensor with integrated electrodes configured in accordance with some embodiments of the present technology.

FIG. 3, corresponding to FIG. 4 of U.S. Pat. No. 6,091,837, is a partially schematic illustration of an active thermal principle fingerprint sensor. The figure shows details of the contact surface between the sensor and the finger. The finger includes an outer skin 10 (epidermis) with a portion 11 having blood circulation (indicated by circular arrows), particularly within papilla 12 in the outer skin 10. The finger also has ridges 13 with valleys 14. The ridges 13 in the finger generally correspond to the papilla 12, which, through the blood circulation in the papilla 12, affects the amount of heat reflected by the ridges 13 as compared to the valleys 14. For example, the ridges 13 come in contact with and are heated by the sensor, and the blood circulation in the finger transports the heat away. In contrast, the surface of the sensor corresponding to the valleys 14 is cooled essentially by two mechanisms, radiation and heat conduction to the air in the valleys 14. These cooling mechanisms are not as efficient as the heat conduction to ridges 13. Accordingly, there is a difference between the temperature measured in ridges 13 and the temperature measured in valleys 14. These temperature differences are measured using sensing elements 15 (e.g., fingerprint sensor pixels), and the measurements are processed to generate an image of the fingerprint on the fingerprint sensor.

As illustrated, each sensor element 15 has a corresponding heating element 21 producing a known amount of heat. In the example shown in FIG. 3, the heating elements 21 are controlled centrally by an input voltage, Vk, and an electronic contact switch 24. The signal from the temperature sensor is addressed and controlled using an electronic contact switch 22, e.g. a double gate MosFET transistor. In the example, the heating elements 21 include one or more resistors and the sensing elements 15 include one or more diodes.

In the example of FIG. 3, the fingerprint sensor also includes an electrically conducting grounded layer 20 (e.g., made from aluminum, or another suitable conducting or semiconducting material) disposed over the sensing elements 15 and the finger. The grounded layer 20 is configured to avoid electric disturbances from the surroundings and to prevent discharges from harming the sensor. The fingerprint sensor may also include a second layer 25 made from a mechanically resistant material (e.g., SiO2, Si3N4 or α-Al2O3), and disposed over the sensing elements 15 to protect the fingerprint sensor from mechanical stress and chemical corrosion. The protective layers 20, 25 may be sufficiently thin as not to hinder the heat transfer to the finger.

As further illustrated, an insulating material 23 is disposed between adjacent sensing elements 15, thereby limiting the heat conduction between the elements. The insulating material 23 may, for example, be made from SiO2 or similar materials. The fingerprint sensor may further include a thermal insulating layer 2 and a heat conducting layer 3 to provide heat throughout the sensor.

FIG. 4 is a partially schematic cross-section of a fingerprint sensor 31 in accordance with some embodiments of the present technology. In the illustrated embodiment, the fingerprint sensor 31 includes a plurality of sensing elements 15 (e.g., thermal pixels) positioned beneath an upper surface of the fingerprint sensor. In some embodiments, the fingerprint sensor 31 includes circuits to independently address each of the sensing elements 15 of the fingerprint sensor 31 (e.g., to independently supply heat to thermal pixels used as sensing elements 15). That is, each of the switches 22a and 22b can be independently controlled to selectively measure each of the sensing elements 15a and 15b, and/or each of the switches 24a and 24b can be selectively controlled to independently drive the corresponding heating elements 21a and 21b. Further, in some embodiments, the sensing elements 15 may be measured at one or more points of time or continuously. Using a plurality of, or continuously obtained, measurements, an image acquisition system communicatively coupled to the fingerprint sensor 31 can generate an image showing changes in the measurements over time. For example, in an example with active thermal pixels, the plurality of, or continuously obtained, measurements allow the image acquisition system to measure the effective heat capacity and/or conductivity of the specimen over time. These measurements allow the image acquisition system to make various determinations about the specimen. For example, live skin cells have a relatively high heat capacity due to a relatively high content of water in the cells. Accordingly, the cells directly touching the sensor surface (even if are typically dead skin cells), typically have a higher heat conductivity than the surrounding air in the valleys 14. This difference in heat capacity enhances the ability of the image acquisition system to distinguish ridges 13 from valleys 14 in the final image.

The fingerprint sensor 31 illustrated in FIG. 4 also includes one or more presence sensors 75 disposed at least partially between some adjacent pixels (e.g., between adjacent sensing elements 15). As will be described further herein, in some embodiments, the presence sensors 75 include electrodes that extend between adjacent columns and/or adjacent rows of pixels of pixel matrix 72 (as illustrated in FIG. 2) (e.g., between sensing elements 15). In some embodiments, the fingerprint sensor 31 can use an appropriate form of capacitive touch techniques, in conjunction with the electrodes, to detect the presence and location of a specimen (such as a finger). That is, for example, the fingerprint sensor 31 can detect whether it is in contact with a finger, as well as which portions of the pixel matrix 72 are in contact with, or adjacent to, the finger. In some embodiments, projected capacitive touch technology (e.g., mutual or self-capacitive) is used. In various embodiments, the presence sensors 75 can be positioned in a single layer or multiple layers. In some embodiments, for example as shown in FIG. 4, the presence sensors 75 are positioned between the sensing elements 15 at about the same vertical position as the sensing elements 15 (e.g., at about the same distance from grounded layer 20). In other embodiments, the presence sensors 75 can be positioned above or below sensing elements 15. In some embodiments, the fingerprint sensor 31 can include an insulating material positioned between the sensing elements 15. For example, in various embodiments, the insulating material can surround the presence sensors 75; the insulating material can be positioned between sensing elements 15 that do not have a presence sensor 75 positioned between them; and/or the insulating material can be positioned at a different vertical level (e.g., below the presence sensors).

As an alternative to, or in addition to, electrodes, the presence sensors 75 can include other sensors configured for detecting the presence of the specimen over one or more pixels in the pixel matrix 72. For example, presence sensors 75 may include one or more pressure sensors, light sensors, color sensors, infrared sensors, ultrasonic sensors, and/or another suitable sensor.

Figure 5A:
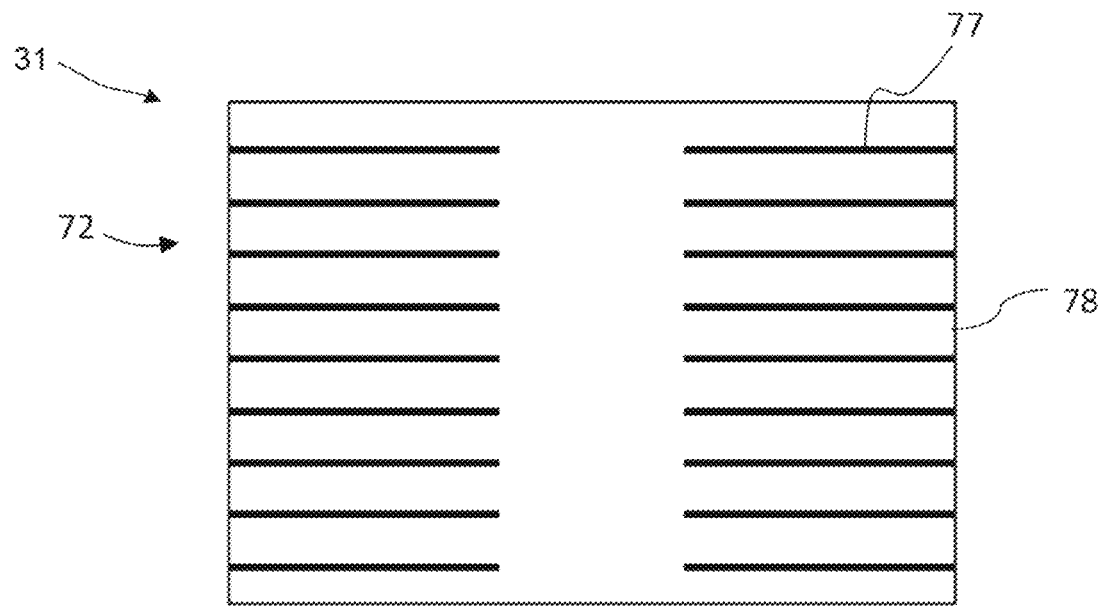
FIG. 5A is a top view partially schematic illustration of a sensor with integrated electrodes configured in accordance with some embodiments of the present technology.

FIG. 5A is a top view partially schematic illustration of the fingerprint sensor 31 in accordance with some embodiments of the present technology. In the illustrated embodiment, the pixel matrix 72 of the fingerprint sensor 31 includes a boundary 78 defined by the perimeter of the pixel matrix 72, and presence sensors in the form of a plurality of electrodes 77 disposed at least partially within the boundary 78. In some embodiments, electrodes 77 are disposed between adjacent pixels of pixel matrix 72 on the same vertical level. In other embodiments, the electrodes 77 are positioned above or below pixel matrix 72, for example in a layered arrangement. In some embodiments, the electrodes 77 are oriented parallel to the rows of pixel matrix 72, for example as shown in FIG. 5A. In other embodiments (not shown), electrodes 77 are oriented parallel to the columns of pixel matrix 72. In other embodiments, the fingerprint sensor 31 includes a matrix or pattern of presence sensors positioned within the boundary 78 of the pixel matrix. In various embodiments, the matrix can be configured to maximize the area of coverage of presence sensors within the boundary 78, to increase coverage in hot spots (e.g., areas most frequently underneath a specimen or near the edge of a specimen), and/or to aid in convenience for scanning the presence sensors.

Figure 5B:
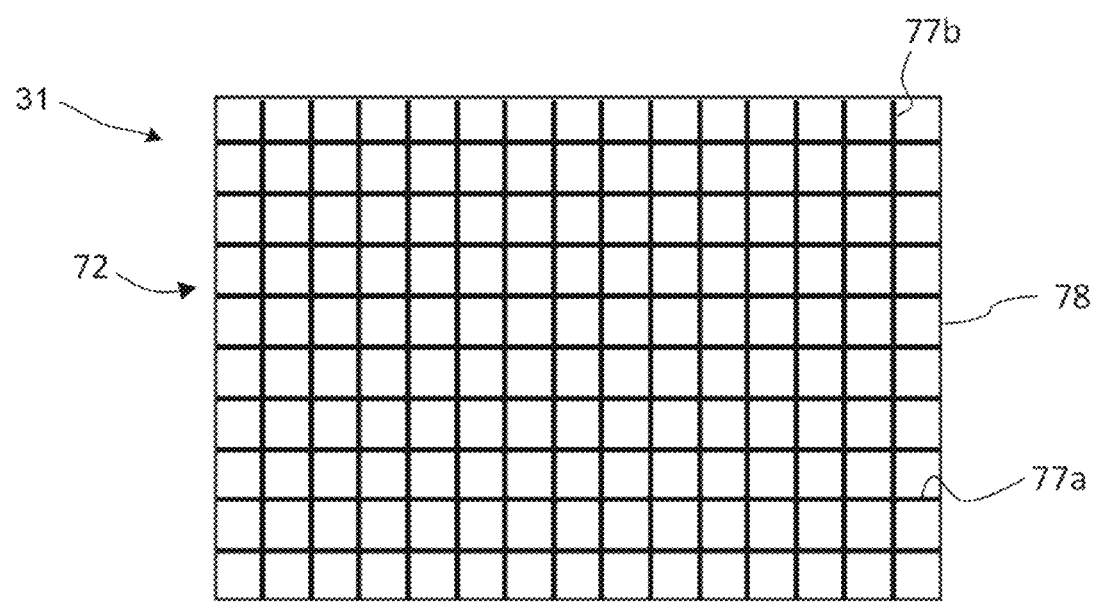
FIG. 5B is a top view partially schematic illustration of a sensor with integrated electrodes configured in accordance with some embodiments of the present technology.

FIG. 5B is a top view partially schematic illustration of the fingerprint sensor 31 in accordance with some embodiments of the present technology. In the illustrated embodiment, the presence sensors are implemented as electrodes, which are disposed in a matrix that includes horizontal electrodes 77a and vertical electrodes 77b forming a grid within the boundary 78 of the pixel matrix 72. In the illustrated embodiment, each of the electrodes 77 extends the entire length of a column or row of the pixel matrix 72. In other embodiments, one or more of the electrodes 77 may cover only part of a column or row of pixel matrix 72. In some embodiments in which one or more electrodes 77 do not extend the entire length of the row or column of pixel matrix 72, for example as shown in FIG. 5A, a first set of electrodes may extend from a first side of pixel matrix 72 and a second set of electrodes may extend from a second side of the pixel matrix 72 opposite the first side such that a space is left between the first and second sets of electrodes. In some embodiments, the gap between the first and second sets of electrodes is less than 25% of the width or height of pixel matrix 72. In some embodiments, the electrodes 77 are arranged such that they do not overlap (i.e., are non-overlapping). In some embodiments, as described herein, electrodes from the first and second set of electrodes overlap. In some embodiments, the electrodes 77 are stacked and separated with an insulating or dielectric layer.

In various embodiments, the electrodes 77 may be any appropriate type, construction, and configuration of electrodes. For example, in some embodiments, each of the electrodes 77 is a discrete electrode. In other embodiments, the electrodes are formed by printing a conductive pattern on a sheet, such as, for example, a polyester (PET) film. In such embodiments, horizontal and vertical electrodes may be printed on separate sheets and laminated together. Such a laminate may further include one or more dielectric layers. The electrodes may be constructed of any suitable material, such as, for example, copper, carbon, silver, or other suitable material.

In some embodiments, paired electrodes are used. For example, each of the electrodes 77 illustrated in FIG. 5A can be a pair of electrodes that support both mutual-capacitive and self-capacitive sensing (sometimes referred to as "mutual-capacitance" and "self-capacitance" sensing, respectively). In mutual-capacitive sensing, sometimes referred to as near-field detection, the electrodes are coupled, such that the resulting signals depend on the coupling capacitance between the pair of electrodes. Mutual-capacitive sensing can be advantageous for detecting the position and movement of a specimen. Accordingly, in some embodiments, the biometric sensor system 30 can use mutual-capacitive sensing to detect the position and/or movement of a specimen on the pixel matrix 72. In self-capacitive sensing, sometimes referred to as far-field detection, each electrode in a pair can be driven independently, or can be driven together with the same driver for more capacitive signal, while an independent signal is received from each electrode. When using self-capacitive sensing, the capacitance flux lines may flow outward from the surface of the sensor, which can make self-capacitive sensing advantageous for detecting the approach or presence of a specimen. Accordingly, in some embodiments, the biometric sensor system 30 can use self-capacitive sensing to detect the presence of the specimen on the pixel matrix 72. In some embodiments, the biometric sensor system 30 can operate the electrodes 77 using a combination of mutual-capacitive sensing and self-capacitance sensing for various purposes. For example, in some embodiments, self-capacitive sensing can be used to detect the presence of a specimen, and mutual-capacitive sensing can be used to determine a precise location of the specimen (based on which the biometric sensor system 30 can identify a scan region). In some embodiments including pairs of electrodes, two electrodes may be disposed next to each other with minimum spacing between them. When operated using mutual capacitance, such embodiments may make use of fringe capacitance to identify changes in capacitance and the position of the specimen. In such embodiments, one electrode of the pair is configured as a transmit (TX) electrode and the other electrode is configured as a receive (RX) electrode.

Further, in some embodiments in which the electrodes 77 extend from both the first and second side of the pixel matrix, there is a space between the electrodes 77 extending from either side. In other embodiments, one or more of the electrodes 77 extending from the first side of the pixel matrix 72 overlap with the electrodes 77 extending from the second side of the pixel matrix 72. In other words, the electrodes 77 may be interlaced. For example, in some embodiments, each of the electrodes 77 extends approximately ¾ of the width or length of the fingerprint sensor 31 such that in a central region of the fingerprint sensor the electrodes extending from opposite sides overlap. This may allow for more resolution in the center portion of the pixel matrix 72. This may be particularly well suited for detecting smaller fingers because there is no "dead band" or gap in the center of the pixel matrix 72. In some embodiments, the signals received from the electrodes 77 can be adjusted to compensate for the overlap area in the center of fingerprint sensor 31.

In some embodiments, the fingerprint sensor 31 is configured to use self-capacitance to detect the presence and location of the specimen to be scanned. In such embodiments, a current may be supplied to each of the electrodes 77. In the absence of a specimen in contact with or adjacent to pixels in the pixel matrix 72, the capacitance of each of the electrodes 77 reaches a steady state. When a specimen (e.g., a finger) is brought into contact with or is adjacent to the pixel matrix 72, the specimen at least partially couples to one or more of the electrodes 77, thereby increasing the effective capacitance of the respective electrodes. Data reflecting the change in capacitance on each of the effected electrodes (e.g., as received from an analog to digital converter) may be used by the image acquisition controller 37 (FIG. 1) to identify the location of the specimen and, further, to determine which pixels of the pixel matrix 72 to scan for image data.

In embodiments in which the fingerprint sensor 31 includes only electrodes 77 that extend parallel to the columns of pixels in pixel matrix 72, the electrodes 77 can include, for example, one or more electrodes positioned on the left side of pixel matrix 72 (not shown) and/or one or more electrodes positioned on the right side of pixel matrix 72 (not shown). The side electrodes allow the image acquisition controller 37 to roughly determine the horizontal position of the specimen by comparing changes in capacitance among the side electrodes positioned on a single side of pixel matrix 72.

Conversely, in embodiments in which the fingerprint sensor 31 includes only electrodes 77 that extend parallel to the rows of pixels in pixel matrix 72, the pixel matrix 72 can include one or more electrodes along the top and/or bottom of the matrix. The top and bottom pixels can allow the image acquisition controller 37 to roughly determine the vertical position of the specimen based on a comparison of the changes in capacitance between the top and bottom electrodes.

In embodiments, such as those shown in FIG. 5B, in which fingerprint sensor 31 includes horizontal electrodes 77a and vertical electrodes 77b, the electrodes form a grid of rows and columns. Image acquisition controller 37 receives data (e.g., from an analog to digital converter) regarding changes in capacitance from both the horizontal electrodes 77a and the vertical electrodes 77b that can allow for more accurate determinations of the position of the specimen relative to pixel matrix 72. In some embodiments, the horizontal electrodes 77a may span the width of pixel matrix 72 and vertical electrodes may span the height of pixel matrix 72.

In other embodiments (not shown), fingerprint sensor 31 includes an array of electrode "pads" that are individually addressable by image acquisition controller 37. The electrode pads can allow for the accurate determination of the position of the specimen, for example by providing a number of sample points throughout the pixel matrix 72.

In various embodiments, the electrodes 77 can be driven individually or, alternatively, the electrodes can be driven together in one or more groups. Driving the electrodes individually may provide the maximum resolution for detecting the location of the specimen. However, individually driving the electrodes 77 may require significant hardware overhead. For example, for a sensor with N electrodes, N drivers may be required. Grouping adjacent electrodes may reduce the hardware overhead required. Further, the analog readings received from the electrodes can be used to identify the location of the specimen.

Although primarily described as using self-capacitance, in some embodiments, the fingerprint sensor 31 uses mutual-capacitance to determine the location of the specimen. For example, in the embodiment shown in FIG. 5B, when driven by an excitation signal, mutual capacitance may be formed at the intersections of the horizontal electrodes 77a and the vertical electrodes 77b, thereby forming a plurality of nodes. In such embodiments, either the horizontal electrodes 77a or the vertical electrodes 77b can be configured as driving lines with the other configured as sensing lines. During operation, capacitance changes at each node can be used to determine which portions of pixel matrix 72 are in contact with, or adjacent to, a specimen. In use, when a specimen (e.g., finger) is adjacent to or touching the pixel matrix 72, some of the mutual capacitance between the horizontal and vertical electrodes that intersect near the position of the specimen couples to the specimen, thereby reducing the capacitance at that node and the charge on the sensing electrode. Data reflecting this change in capacitance (e.g., as received from an analog to digital converter) at the various nodes can then be used by image acquisition controller 37 to determine the location of the specimen relative to pixel matrix 72. Accordingly, in various embodiments, which portions of the pixel matrix 72 that are deemed "adjacent to" a specimen can include the entire portion in which some change in capacitance is sensed by the electrodes, the portion in which the change in capacitance is above a predefined threshold, and/or the portion in which the change in capacitance is within a predefined window. For example, in various embodiments, the threshold can be set such that a live specimen is expected to cause a capacitance change above the threshold in each of the immediately neighboring row and column, in each of the five neighboring rows and columns, in each of the ten neighboring rows and columns, or any other suitable distance away.

Representative Processes of a Fingerprint Sensor

As described above, data from one or more presence sensors, such as capacitive signals received from electrodes 77, can be indicative of whether a specimen, such as a finger, is in contact with (or adjacent to) the pixel matrix 72 at various locations. Based on this information, and as described herein, a biometric sensor system can adjust which locations are activated or sensed for scanning. Advantageously, this can reduce the time to perform a scan, reduce the power consumed by a scan, and other benefits. In some embodiments, the image acquisition controller 37 can direct the fingerprint sensor 31 to address and/or scan only the pixels that are in the area of interest (i.e., the area in contact with, or adjacent to, the specimen). This can be performed in less time than addressing each of the pixels in pixel matrix 72. Hence, the overall scan time may be reduced without reducing the accuracy or quality of the scan. In addition, the time required to process the resulting image may also be reduced due to the reduction in the amount of data that needs to be processed (e.g., the amount of image data that is compared to a template fingerprint). This may further reduce the computing resources consumed by a fingerprint scan and analysis and reduce the power consumption of fingerprint sensor 31 and the biometric sensor system 30. The processes of evaluating the capacitive measurements and determining which portions of fingerprint sensor 31 to be scanned may be performed by ASIC 32, MCU 33, other components of the image acquisition controller 37, and/or the host system (e.g., a processor of a smart card or smartphone), either alone or in combination.

While presence sensors are primarily described below in the form of electrodes, it will be understood that other sensors or components (e.g., pressure sensors, light sensors, color sensors, infrared sensors, ultrasonic sensors, and/or another suitable sensor) can be used as presence sensors in the described technology. References to electrodes are understood to encompass these additional forms of presence sensors, with corresponding differences in their signals.

Figure 6:
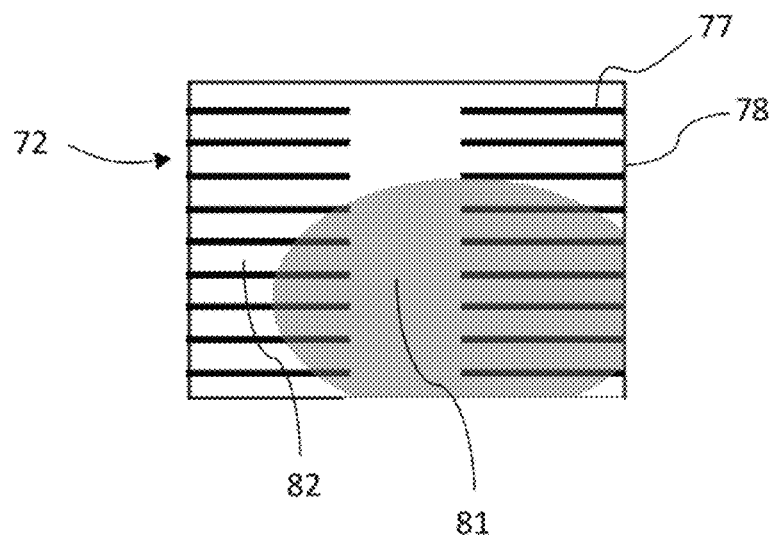
FIG. 6 is a top view partially schematic illustration of the use of the sensor with integrated electrodes of FIG. 5A during use to identify areas of the sensor that are in contact with a specimen in accordance with some embodiments of the present technology.

FIG. 6 is a top view partially schematic illustration, in accordance with some embodiments of the present technology, of a specimen in contact with the pixel matrix 72 of FIG. 5A that includes integrated electrodes 77. As illustrated, a specimen touching the pixel matrix 72 may contact only a first portion 81 of the pixel matrix 72, leaving, a second portion 82 of the pixel matrix 72 not in contact with the specimen. As a result, the capacitive signals from the electrodes 77 within the first portion 81 (e.g., each of the electrodes 77 at least partially within the grey first portion 81) will differ from the capacitive signals from the electrodes 77 in the second portion 82 (e.g., each of the electrodes not partially within the grey first portion 81). The image acquisition controller 37 (e.g., ASIC 32, MCU 33, and/or a processor of the host system) can perform operations to determine, based on the differing capacitive signals received from the electrodes 77, which portions of the pixel matrix 72 are in contact with and/or adjacent to, the specimen. Accordingly, the image acquisition controller 37 can identify the portion of the pixel matrix 72 in contact with the finger (e.g., the first portion 81). For example, the first portion 81 may include those electrodes 77 that detect a capacitance change within a specified range (e.g., a range expected for human skin, the range expected for human skin plus one or more deviations, or some other suitable range). In some embodiments, for example, the specified range can be between approximately 0.3 picofarads (pF) to approximately 3 pF, or between approximately 0.8 pF to approximately 2.2 pF, or between approximately 1 pF to approximately 2 pF, or other suitable ranges. In some embodiments, the first portion may include those electrodes 77 that measure a change in capacitance that falls above a predefined threshold value. For example, in some embodiments, the first portion can include those electrodes 77 that measure a change in capacitance (between electrodes 77 in the first portion 81 and the second portion 82) exceeds a threshold of approximately 0.2 pF, of approximately 0.5 pF, of approximately 1 pF, or other suitable thresholds.

After determining the first portion 81 of the pixel matrix 72 (e.g., the region that is in contact with the finger), the image acquisition controller 37 can direct the fingerprint sensor 31 to address and scan only the pixels of pixel matrix 72 within the first portion 81. As a result, the scan time is reduced by the time it would have taken to scan the second portion 82 (e.g., the region that is determined to not contact any of the specimen). In some embodiments, the image acquisition controller 37 can identify a third portion (not shown) surrounding the first portion 81 that is also scanned to ensure that the entire finger is scanned. For example, in some embodiments, the third portion can increase the scanned area by 10% in order to provide a buffer around the first region to ensure the specimen is fully scanned. Any appropriate method of selectively addressing the pixels of pixel matrix 72 may be used. For example, in one embodiment, the rows and/or columns of the untouched area in the second portion 82 are omitted from the scanning commands from the image acquisition controller 37, are not clocked by the image acquisition controller 37, etc. thereby causing the fingerprint sensor 31 to skip those rows and/or columns during scanning.

In some embodiments, the electrodes 77 in the fingerprint sensor 31, are further configured to allow certain conditions of the specimen to be determined based on the capacitive signals received from electrodes 77. In some embodiments, the image acquisition controller 37 can adjust one or more parameters for obtaining image data from the pixels of pixel matrix 72 based on the capacitive signals. For example, the electrodes 77 can be used to determine a moisture level of the specimen (i.e., the amount of moisture on the skin). In some embodiments, the magnitude of the capacitance change in the signals is dependent on the moisture level of the specimen, such that determining the moisture level allows the image acquisition controller 37 to control for the moisture level in determining the first portion 81. For example, moisture typically increases the magnitude of the capacitance change, including in electrodes adjacent to the specimen. Accordingly, the image acquisition controller 37 can require a larger change in capacitance for moist specimens, thereby avoiding scanning a larger area than necessary to examine the specimen. In some embodiments, the moisture level is related to the electrical and/or thermal conductivity of the specimen. Accordingly, the image acquisition controller 37 can use information regarding the moisture level of the to configure processing parameters for the scan (e.g., a heating time per pixel, voltage applied to each pixel, or any other suitable processing parameter).

In some embodiments, the electrodes 77 in the pixel matrix 72 may be used to detect attempted presentation attacks (also referred to herein as "spoofing"). Because the electrodes 77 can be used to measure the capacitance between each of the electrodes 77 and the specimen, the image acquisition controller 37 can use the electrodes 77 to detect and prevent spoofing by determining whether the specimen generates a capacitance profile (i.e., a map of collected capacitance information) that is indicative of a living specimen (e.g., from a user's finger). For example, the image acquisition controller 37 can measure a change in capacitance between electrodes 77 in the first portion 81 and the second portion 82. In some embodiments, a change that falls within a predefined range can indicate than an authentic specimen (e.g., a live finger) is in contact with or adjacent to the pixel matrix 72. For example, in some embodiments, the biometric sensor system 30 can detect an authentic specimen when the change in capacitance (between electrodes 77 in the first portion 81 and the second portion 82)

measures between approximately 0.4 pF to approximately 2.5 pF, or between approximately 0.8 pF to approximately 2.2 pF, or between approximately 1 pF to approximately 2 pF, or other suitable ranges. In some embodiments, a change in capacitance that falls above a predefined threshold value can indicate that an authentic specimen (e.g., a live finger) is in contact with or adjacent to the pixel matrix 72. For example, in some embodiments, the biometric sensor system 30 can detect an authentic specific when the change in capacitance (between electrodes 77 in the first portion 81 and the second portion 82) exceeds a threshold of approximately 0.4 pF, of approximately 0.5 pF, of approximately 1 pF, or other suitable thresholds. The electrodes 77 thereby enable the image acquisition controller 37 to evaluate capacitance values, and detect fake fingers constructed of plastic or gel when the fake fingers do not create a capacitance profile similar to that generated by human skin. In some embodiments, the biometric sensor system 30 detects a spoof specimen, or fake finger, when a change in capacitance is detected that is a fraction of the expected change of capacitance from an authentic specimen. For example, the biometric sensor system 30 may detect a fake finger when a change in capacitance of approximately of approximately one-third of an expected change in capacitance is detected. For example, in an embodiment in which a threshold of 1.2 pF is used by the biometric sensor system 30 to determine whether a specimen is authentic, a measured capacitive change of 0.4 pF may be detected as a spoof specimen or fake finger by the biometric sensor system. Because pixel matrix 72 can include a plurality of electrodes 77, a map of capacitance information may be collected. The map can allow the image acquisition controller 37 to detect more sophisticated attacks that are not identifiable using a single sensing electrode. That is, the image acquisition controller 37 can use the map to evaluate capacitance signals from each of the electrodes 77 within the first portion. Since the image acquisition controller 37 evaluates signals from each of the electrodes 77 contacted, each part of the specimen contacting the pixel matrix 72 must be a live finger. Accordingly, each of the electrodes 77 in the first portion 81 enables the image acquisition controller 37 to detect a spoofing attempt, such that the entire specimen that is scanned must be a live specimen.

Figure 7:
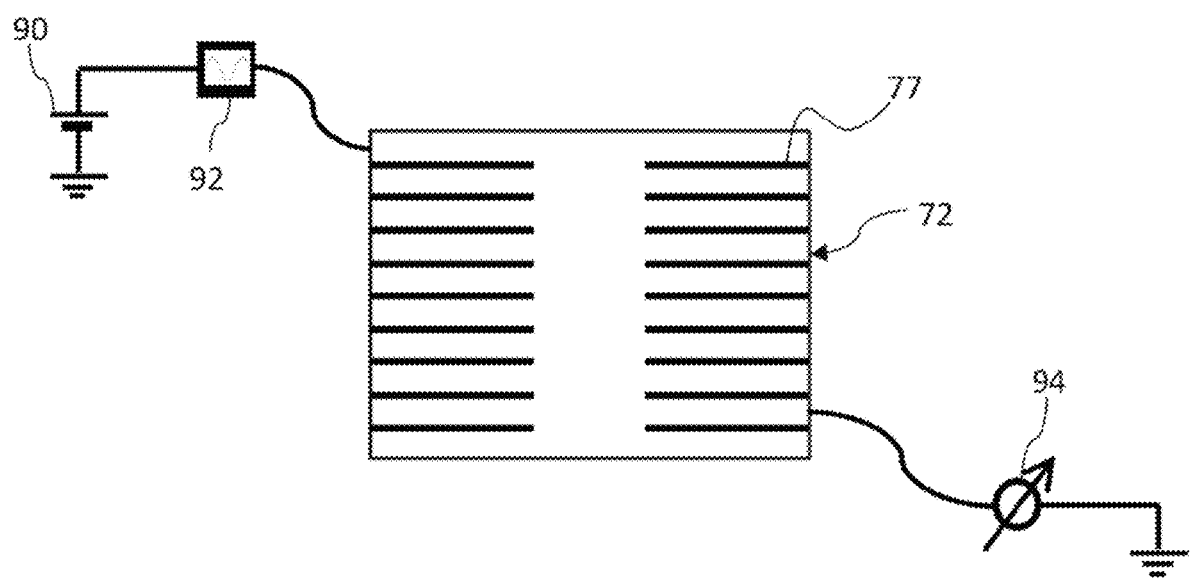
FIG. 7 is an illustration of a sensor configured for detection of spoofing attacks in accordance with some embodiments of the present technology.

FIG. 7 an illustration of a system configured for detection of spoofing attacks in accordance with some embodiments of the present technology. In the illustrated embodiment, the system includes a power source 90 that is configured to provide supply current to the system, and a signal generator 92 configured to introduce a signal to one or more selected electrodes 77. In some embodiments, the respective electrodes 77 are multiplexed or addressed sequentially. In the illustrated embodiment, the system also includes a signal detector sink 94 configured to measure an output signal from the electrodes 77. As described herein, the signal detector sink 94 can measure an output signal to determine, for example, a capacitance value. The system can utilize the measured capacitance value to, for example, detect the presence of a sample and/or evaluate whether a sample is from a living specimen. In some embodiments, the signal detector sink 94 can be housed in the image acquisition controller 37. The output signals are evaluated to derive information for detecting spoof specimens on the pixel matrix 72 (e.g., the capacitance generated by the sample). In various embodiments, the evaluation can be performed by ASIC 32, MCU 33, any other component of the image acquisition controller 37, or in a host system receiving a converted digital signal from the sensor system. Accordingly, the inclusion of electrodes 77 within the active pixel matrix 72 enables the system to detect spoofing attacks, which is not possible in prior art active thermal sensors.

The systems described herein may include any appropriate components for driving the electrodes and receiving and processing the capacitance measurements. For example, the systems may include driver integrated circuits to supply an excitation signal to the electrodes. The systems may further include an analog to digital converter to convert the capacitance measurements to a digital signal that can be processed by image acquisition controller 37. In some embodiments, the systems include a sigma-delta analog to digital converter. These components can be integrated into ASIC 32, MCU 33, other components of the image acquisition controller 37, or components of a separate microcontroller (e.g., within the host system).

The dimensions of the electrodes 77 and the pixels of pixel matrix 72 can be configured to provide any desired scan area and resolution. For example, the Fingerprint Acquisition Profile (FAP)20 standard requires a nominal width of 15.24 mm and a resolution of 500 ppi. In one embodiment of a FAP20 compliant sensor, each pixel of the pixel matrix 72 has a size of about 50.8 lam by about 50.8 μm. In addition, in various embodiments, the pixel matrix 72 may include six electrode pairs (i.e., two electrodes running parallel to each other and in close proximity), with each pair having a width in the range between approximately 10 μm and approximately 40 μm (e.g., 10 μm, 20 μm, 29 μm, 30 μm, or 40 μm).

In some embodiments, the electrodes 77 (or electrode pairs) are evenly distributed in the pixel matrix 72. In some other embodiments, the electrodes 77 are unevenly distributed within the pixel matrix 72. For example, in some embodiments, the electrodes 77 are more closely spaced nearer a hot zone (e.g., near the center of pixel matrix 72) than nearer a cold zone (e.g., a less active area of the pixel matrix 72, such as near the perimeter of pixel matrix 72). The more tightly spaced arrangement in hot zone of the pixel matrix 72 allows for accurate identification of the specimen when the specimen is in contact with the pixel matrix 72 while minimizing the extra components needed to fit into the pixel matrix 72. This may be advantageous as users are more likely to place their finger in contact with, for example, the center of the pixel matrix 72 than the edge of the pixel matrix 72.

Figure 8:
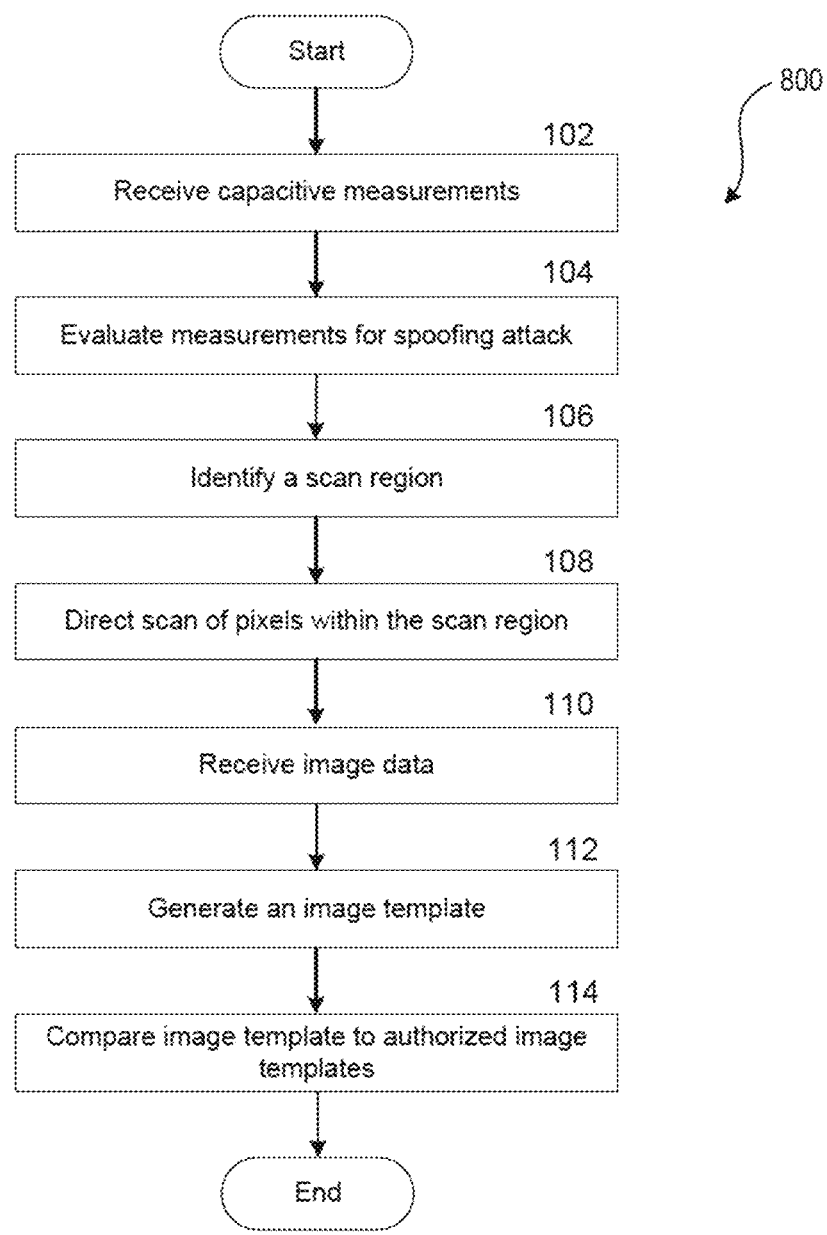
FIG. 8 is a flow diagram of a process for generating an image of a specimen in accordance with some embodiments of the present technology.

FIG. 8 is a flow diagram of a process 800, performed by a biometric sensor system, for generating an image of a specimen in accordance with some embodiments of the present technology. As described further below, the process 800 provides for the scanning of selected regions of a fingerprint sensor, based on the detection of which regions of the fingerprint sensor are in contact with the specimen. The process can be performed by an image acquisition controller, a fingerprint sensor, and/or other components of the biometric sensor system, alone or in combination. The process 800 begins when a specimen contacts a fingerprint sensor which, as described above, results in the fingerprint sensor generating capacitive signals (or other signals) corresponding to different positions within the fingerprint sensor.

At block 102, the biometric sensor system receives capacitive signals from the electrodes in the fingerprint sensor.

At block 104, the biometric sensor system evaluates the received capacitive signals to detect a spoofing attack. For example, the biometric sensor system can process the received signals to determine whether they indicate the presence of a live finger on the fingerprint sensor. As discussed above, this check can be based on the change in the capacitive signals. For example, the biometric sensor system can evaluate the capacitive measurements to detect whether they reflect a change in capacitance above a predetermined threshold.

At block 106, the biometric sensor system identifies a scan region based on the capacitive signals. The scan region is a portion of the pixel matrix that is in contact with or adjacent to a specimen. That is, the biometric sensor system can evaluate the capacitive signals to detect whether they reflect a change in capacitance above a predetermined threshold. It will be appreciated that in some embodiments, the predetermined threshold used to detect the presence of a specimen differs from the predetermined threshold used to detect whether a specimen is "live" or a spoof. In some embodiments, the scan region also includes a portion of the pixel matrix adjacent to the contacted portion. Including the extra portion can reduce the chance that any relevant portion of the specimen is not scanned and account for slight movements during the scanning process. In some embodiments, the biometric sensor system can perform identification of the scan region in block 106 before evaluating the received capacitive signals to detect a spoofing attack in block 104. For example, in some embodiments, the change in capacitance evaluated in block 104 can be based on the electrodes identified in the scan region and electrodes identified outside of the scan region in block 106.

At block 108, the biometric sensor system directs the scan of the pixels of the pixel matrix based on the identified scan region. In some embodiments, the biometric sensor system directs the fingerprint sensor to address and scan only the pixels that are within the identified scan region. In some embodiments, the biometric sensor system directs the fingerprint sensor to address and scan each pixel of the pixel matrix, and discards and/or does not further process the image data received from the pixels outside of the scan region. The reduced scanning and/or processing can reduce the time required to generate an image template of the specimen. Further, because the biometric sensor system can be configured to discard irrelevant image data, the process 800 can be used in conjunction with fingerprint sensors that do not have hardware that allows the fingerprint sensor to selectively address and scan of pixels.

At block 110, the biometric sensor system receives image data resulting from the directed scan (e.g., signals from the plurality of scanned pixels). At block 112, the biometric sensor system generates an image template of the image of the specimen (e.g., an image of the fingerprint). In some embodiments, generating the template includes extracting characteristic features of the fingerprint, such as minutiae in the received image data. As described above, because the system limits the pixel regions scanned to those in contact with or adjacent to a specimen (and/or discards the image data from outside the scan region), and therefore generates an image template corresponding to only the region activated by the specimen (e.g., where there is fingerprint data), the total image data received and/or processed is reduced. As a result, the time the biometric sensor system takes to generate an image template of a specimen is advantageously reduced.

At block 114, the biometric sensor system compares the generated image template to stored image templates to determine whether the generated image template matches any of the stored image templates. If the generated image template matches a stored image template, the biometric sensor system can authorize the scanned specimen; else the biometric sensor system can reject the specimen. In other embodiments, the biometric sensor system can pass the generated image template onto another system for the matching comparison. In these embodiments, the overall system can further save on time by communicating and/or processing the generated image for a match and processing the capacitive signals to detect a spoofing attack (block 104) in parallel.

Figure 9:
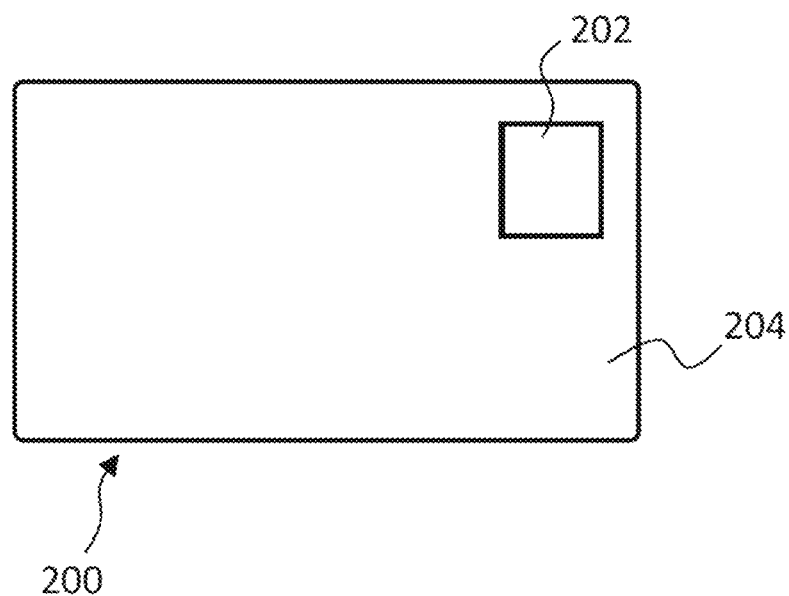
FIG. 9 is a partially schematic illustration of a smart card with embedded fingerprint sensor configured in accordance with some embodiments of the present technology.

FIG. 9 is a partially schematic illustration of a smart card 200 with embedded fingerprint sensor, according to some embodiments of the present technology. In the illustrated embodiment, the smart card 200 includes an embedded fingerprint sensor system 202 exposed through the top surface 204 of the card 200. The fingerprint sensor system 202 may be configured in accordance with any of the embodiments described herein. The top surface 204 of the card 200 may have identification information (e.g., photograph of the user and/or name), account information (e.g., credit card account information), brand information or any other information related to the use of the card. Likewise, the back surface of the card (not shown) may have a signature block, magnetic stripe and/or other information such as CVV number.

Figure 10:
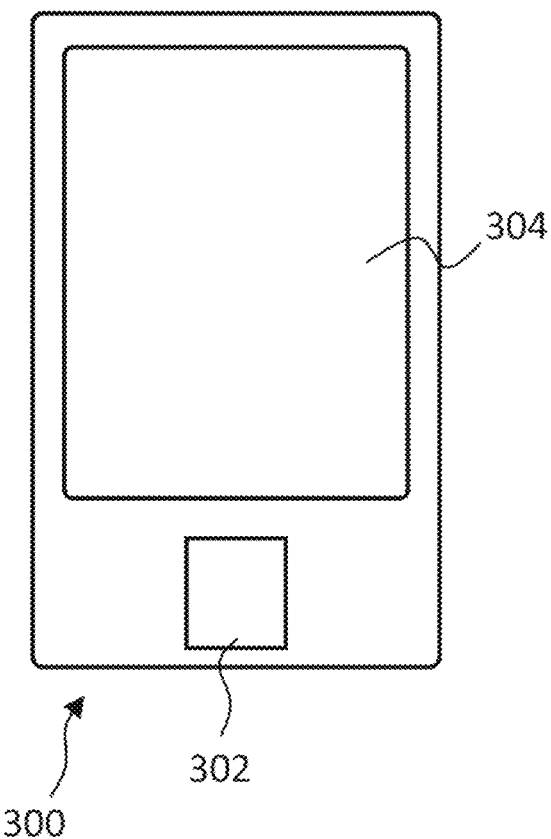
FIG. 10 is a partially schematic illustration of a computing device with integrated fingerprint sensor configured in accordance with some embodiments of the present technology.

Similarly, FIG. 10 is schematic illustration of a computing device 300 with an integrated fingerprint sensor, according to some embodiments of the present technology. In the illustrated embodiment, the computing device 300 includes an embedded fingerprint sensor system 302. The fingerprint sensor system 302 may be configured in accordance with any of the embodiments described herein. Computing device 300 may be, for example, a smartphone, tablet computer, laptop computer, point of sale device, or any other suitable computing system. In some embodiments, computing device 300 includes a display unit 304 for displaying information to a user and, in some embodiments, receiving input from the user. In operation, display unit 304 can display results of a scan operation using fingerprint sensor system 302 (e.g., an indication of whether the user was authenticated). Although the fingerprint sensor system 302 is shown integrated with computing device 300 in the illustrated embodiment, it will be understood that, in other embodiments, the fingerprint sensor system 302 can be separate from and connected to the computing device 300 via wires (e.g., a USB cable) or a wireless connection.

EXAMPLES

Various examples of aspects of the subject technology described above with reference to FIGS. 1-10 are provided as numbered clauses (1, 2, 3, etc.) for convenience. These are provided as examples and do not limit the subject technology.

1. A fingerprint sensor system, comprising:
   an active thermal sensor pixel matrix comprising a plurality of pixels arranged in a plurality of rows and a plurality of columns, the pixel matrix having a boundary defining a perimeter of the pixel matrix;
   a plurality of presence sensors disposed at least partially within the boundary of the pixel matrix; and
   an image acquisition controller coupled to the pixel matrix and to the plurality of presence sensors, the image acquisition controller configured to:
   receive signals from the plurality of presence sensors;
   identify, based on the signals, a scan region, wherein the scan region is a portion of the pixel matrix that is in contact with or adjacent to a specimen; and obtain image data only from pixels of the plurality of pixels that are within the scan region for generating an image of the specimen.

2. The fingerprint sensor system of clause 1, wherein the presence sensors comprise a plurality of electrodes disposed at least partially within the boundary of the pixel matrix, and wherein the signals reflect capacitive measurements.

3. The fingerprint sensor system of clause 2, wherein the plurality of electrodes includes pairs of electrodes having a first electrode and a second electrode disposed adjacent to the first electrode, and wherein the first electrode is configured as a transmit electrode and the second electrode is configured as a receive electrode.

4. The fingerprint sensor system of clauses 2-3, wherein the image acquisition controller is further configured to adjust one or more parameters for obtaining image data from the pixels based on the capacitive measurements.

5. The fingerprint sensor system of clause 4, wherein the capacitive measurements reflect an amount of moisture on the specimen, and the image acquisition controller is configured to adjust a processing parameter based on the capacitive measurements.

6. The fingerprint sensor system of clauses 1-5, wherein each of the plurality of presence sensors is disposed between adjacent rows or adjacent columns of the pixel matrix.

7. The fingerprint sensor system of clauses 1-6, wherein the plurality of presence sensors include a plurality of horizontal presence sensors and a plurality of vertical presence sensors, and wherein each of the plurality of horizontal presence sensors is disposed between adjacent rows of the pixel matrix and each of the plurality of vertical presence sensors is disposed between adjacent columns of the pixel matrix.

8. The fingerprint sensor system of clauses 1-7, wherein the plurality of presence sensors include a first set of presence sensors that extend from a first side of the pixel matrix and a second set of presence sensors that extend from a second side of the pixel matrix opposite the first side, and wherein the first set of presence sensors and the second set of presence sensors overlap in a center of the pixel matrix.

9. A fingerprint sensor system comprising:
an active thermal sensor pixel matrix comprising a plurality of pixels arranged in a plurality of rows and a plurality of columns, the pixel matrix having a boundary defining a perimeter of the pixel matrix;
a plurality of electrodes disposed at least partially within the boundary of the pixel matrix; and
an image acquisition controller coupled to the pixel matrix and the plurality of electrodes, the image acquisition controller configured to:
receive signals from the plurality of electrodes, wherein the signals reflect capacitive measurements;
determine when the capacitive measurements reflect a change in capacitance above a predetermined threshold, wherein a change in capacitance above the predetermined threshold indicates that a living specimen is in contact with or adjacent to the sensor; and
when the change in capacitance is above the predetermined threshold, obtain image data from pixels of the pixel matrix for generating an image.

10. The fingerprint sensor system of clause 9, wherein the image acquisition controller is further configured to, when the change in capacitance is above the predetermined threshold, identify, based on the capacitive measurements, a scan region, wherein the scan region is a portion of the pixel matrix that is in contact with or adjacent to a specimen.

11. The fingerprint sensor system of clause 10, wherein the image acquisition controller obtains image data only from pixels of the pixel matrix that are within the scan region.

12. The fingerprint sensor system of clauses 10-11, wherein the image acquisition controller obtains image data from each of the pixels of the pixel matrix, and wherein the image acquisition controller is configured to generate an image using only image data obtained from pixels of the pixel matrix within the scan region.

13. The fingerprint sensor system of clauses 9-12, wherein:
the plurality of electrodes includes pairs of electrodes having a first electrode and a second electrode disposed adjacent to the first electrode;
the capacitive measurements include first capacitive measurements form the first electrode and second capacitive measurements from the second electrode; and
the image acquisition controller is configured to:
receive the first capacitive measurements from the first electrode and the second capacitive measurements the second electrode; and
determine when the first capacitive measurements and the second capacitive measurements both reflect a change in capacitance above the.

14. The fingerprint sensor system of clauses 9-13, wherein the image acquisition controller is further configured to adjust one or more parameters for obtaining image data from the pixels based on the capacitive measurements.

15. The fingerprint sensor system of clause 14, wherein the capacitive measurements reflect an amount of moisture on the specimen, and the image acquisition controller is configured to adjust a processing parameter based on the capacitive measurements.

16. The fingerprint sensor system of clauses 9-15, wherein each of the plurality of electrodes is disposed between adjacent rows or adjacent columns of the pixel matrix.

17. fingerprint sensor system of clause 16, wherein the plurality of presence sensors include a first set of presence sensors that extend from a first side of the pixel matrix and a second set of presence sensors that extend from an opposite second side of the pixel matrix, and wherein the first set of presence sensors and the second set of presence sensors overlap in a center of the pixel matrix.

18. The fingerprint sensor system of clauses 9-17, wherein the plurality of electrodes include a plurality of horizontal electrodes and a plurality of vertical electrodes, and wherein each of the plurality of horizontal electrodes is disposed between adjacent columns of the pixel matrix and each of the plurality of vertical electrodes is disposed between adjacent rows of the pixel matrix.

19. A fingerprint sensor system comprising:
an active thermal sensor pixel matrix comprising a plurality of pixels arranged in a plurality of rows and a plurality of columns, the pixel matrix having a boundary defining a perimeter of the pixel matrix; and
a plurality of electrodes disposed at least partially within the boundary of the pixel matrix, wherein the plurality of electrodes includes a first set of electrodes that extend from a first side of the pixel matrix and a second set of electrodes that extend from an opposite second side of the pixel matrix; and
an image acquisition controller coupled to the pixel matrix and the plurality of electrodes, the image acquisition controller configured to:
receive signals from the plurality of electrodes, wherein the signals reflect capacitive measurements;

identify, based on the signals, a scan region, wherein the scan region is a portion of the pixel matrix that is in contact with or adjacent to a specimen; and obtain image data only from pixels of the plurality of pixels that are within the scan region for generating an image of the specimen.

20. The fingerprint sensor system of clause 19, wherein the first set of presence sensors and the second set of presence sensors overlap in a center of the pixel matrix.

21. The fingerprint sensor system of clauses 19-20, wherein the plurality of electrodes is operated on a combination of mutual-capacitive sensing and self-capacitance sensing.

22. The fingerprint sensor system of clauses 19-20, wherein the plurality of electrodes is operated on a combination of far-field sensing and near-field sensing, and wherein the far-field sensing is used to detect a presence of the specimen on the pixel matrix and the near-field sensing is used to detect a location of the specimen on the pixel matrix.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A fingerprint sensor system, comprising:
an active thermal sensor pixel matrix comprising a plurality of pixels arranged in a plurality of rows and a plurality of columns, the pixel matrix having a boundary defining a perimeter of the pixel matrix;
a plurality of presence sensors disposed at least partially within the boundary of the pixel matrix, wherein the plurality of presence sensors comprise a plurality of electrodes disposed at least partially within the boundary of the pixel matrix, and the plurality of electrodes include pairs of electrodes having a first electrode and a second electrode disposed adjacent to the first electrode; and
an image acquisition controller coupled to the pixel matrix and to the plurality of presence sensors, the image acquisition controller configured to:
receive signals from the plurality of presence sensors, wherein the signals reflect capacitive measurements including first capacitive measurements from the first electrode and second capacitive measurements from the second electrode;
determine when either of the first capacitive measurements and the second capacitive measurements reflect a change in capacitance above the predetermined threshold;
identify, based on the signals, a scan region, wherein the scan region is a portion of the pixel matrix that is in contact with or adjacent to a specimen; and
obtain image data only from pixels of the plurality of pixels that are within the scan region for generating an image of the specimen.

2. The fingerprint sensor system of claim 1, wherein the first electrode is configured as a transmit electrode and the second electrode is configured as a receive electrode.

3. The fingerprint sensor system of claim 1, wherein the image acquisition controller is further configured to adjust one or more parameters for obtaining image data from the pixels based on the capacitive measurements.

4. The fingerprint sensor system of claim 3, wherein the capacitive measurements reflect an amount of moisture on the specimen, and the image acquisition controller is configured to adjust a processing parameter based on the capacitive measurements.

5. The fingerprint sensor system of claim 1, wherein each of the plurality of presence sensors is disposed between adjacent rows or adjacent columns of the pixel matrix.

6. The fingerprint sensor system of claim 1, wherein the plurality of presence sensors includes a plurality of horizontal presence sensors and a plurality of vertical presence sensors, and wherein each of the plurality of horizontal presence sensors is disposed between adjacent rows of the pixel matrix and each of the plurality of vertical presence sensors is disposed between adjacent columns of the pixel matrix.

7. The fingerprint sensor system of claim 1, wherein the plurality of presence sensors include a first set of presence sensors that extend from a first side of the pixel matrix and a second set of presence sensors that extend from a second side of the pixel matrix opposite the first side, and wherein the first set of presence sensors and the second set of presence sensors overlap in a center of the pixel matrix.

8. A fingerprint sensor system comprising:
an active thermal sensor pixel matrix comprising a plurality of pixels arranged in a plurality of rows and a plurality of columns, the pixel matrix having a boundary defining a perimeter of the pixel matrix;
a plurality of electrodes disposed at least partially within the boundary of the pixel matrix, wherein the plurality of electrodes include pairs of electrodes having a first electrode and a second electrode disposed adjacent to the first electrode; and
an image acquisition controller coupled to the pixel matrix and the plurality of electrodes, the image acquisition controller configured to:
receive signals from the plurality of electrodes, wherein the signals reflect capacitive measurements, wherein the capacitive measurements include first capacitive measurements from the first electrode and second capacitive measurements from the second electrode;
determine when either of the first capacitive measurements and the second capacitive measurements reflect a change in capacitance above a predetermined threshold, wherein a change in capacitance above the predetermined threshold indicates that a living specimen is in contact with or adjacent to the sensor; and
when the change in capacitance is above the predetermined threshold, obtain image data from pixels of the pixel matrix for generating an image.

9. The fingerprint sensor system of claim 8, wherein the image acquisition controller is further configured to, when the change in capacitance is above the predetermined threshold, identify, based on the capacitive measurements, a scan region, wherein the scan region is a portion of the pixel matrix that is in contact with or adjacent to a specimen.

10. The fingerprint sensor system of claim 9, wherein the image acquisition controller obtains image data only from pixels of the pixel matrix that are within the scan region.

11. The fingerprint sensor system of claim 9, wherein the image acquisition controller obtains image data from each of the pixels of the pixel matrix, and wherein the image acquisition controller is configured to generate an image using only image data obtained from pixels of the pixel matrix within the scan region.

12. The fingerprint sensor system of claim 8, wherein the image acquisition controller is further configured to adjust one or more parameters for obtaining image data from the pixels based on the capacitive measurements.

13. The fingerprint sensor system of claim 12, wherein the capacitive measurements reflect an amount of moisture on the specimen, and the image acquisition controller is configured to adjust a processing parameter based on the capacitive measurements.

14. The fingerprint sensor system of claim 8, wherein each of the plurality of electrodes is disposed between adjacent rows or adjacent columns of the pixel matrix.

15. The fingerprint sensor system of claim 8, wherein the plurality of electrodes include a plurality of horizontal electrodes and a plurality of vertical electrodes, and wherein each of the plurality of horizontal electrodes is disposed between adjacent columns of the pixel matrix and each of the plurality of vertical electrodes is disposed between adjacent rows of the pixel matrix.

16. A fingerprint sensor system comprising:
an active thermal sensor pixel matrix comprising a plurality of pixels arranged in a plurality of rows and a plurality of columns, the pixel matrix having a boundary defining a perimeter of the pixel matrix; and
a plurality of electrodes disposed at least partially within the boundary of the pixel matrix, wherein the plurality of electrodes includes a first set of electrodes that extend from a first side of the pixel matrix and a second set of electrodes that extend from an opposite second side of the pixel matrix, wherein the plurality of electrodes includes pairs of electrodes having a first electrode and a second electrode disposed adjacent to the first electrode; and
an image acquisition controller coupled to the pixel matrix and the plurality of electrodes, the image acquisition controller configured to:
receive signals from the plurality of electrodes, wherein the signals reflect capacitive measurements, the capacitive measurements include first capacitive measurements from the first electrode and second capacitive measurements from the second electrode;
determine when either of the first capacitive measurements and the second capacitive measurements reflect a change in capacitance above the predetermined threshold;
identify, based on the signals, a scan region, wherein the scan region is a portion of the pixel matrix that is in contact with or adjacent to a specimen; and
obtain image data only from pixels of the plurality of pixels that are within the scan region for generating an image of the specimen.

17. The fingerprint sensor system of claim 16, wherein the first set of presence sensors and the second set of presence sensors overlap in a center of the pixel matrix.

18. The fingerprint sensor system of claim 16, wherein a gap exists between the first set of electrodes and the second set of electrodes.

19. The finger print sensor system of claim 18, wherein the gap is less than 25% of a width or height of the pixel matrix.

20. The fingerprint sensor system of claim 1, wherein the plurality of presence sensors include a first set of presence sensors that extend from a first side of the pixel matrix and a second set of presence sensors that extend from an opposite second side of the pixel matrix, and wherein the first set of presence sensors and the second set of presence sensors do not overlap with each other.

21. The fingerprint sensor system of claim 1, wherein the first electrode and the second electrode are configured for mutual-capacitive sensing.

22. The fingerprint sensor system of claim 1, wherein the first electrode and the second electrode are configured for self-capacitive sensing.

* * * * *